United States Patent [19]

Schwarze et al.

[11] Patent Number: 5,037,872

[45] Date of Patent: Aug. 6, 1991

[54] SUBSTITUTED N-TRICHLOROMETHYL THIODICARBOXIMIDES AND N,N-SUBSTITUTED BIS-(2,4-DIAMINO-S-TRIAZIN-6YL)-OLIGO-SULFIDES IN VULCANIZABLE RUBBER

[75] Inventors: Werner Schwarze, Frankfurt am Main; Siegfried Wolff, Bornheim-Merten; Horst Lambertz, Hürth, all of Fed. Rep. of Germany

[73] Assignee: Federal Republic of Germany, Fed. Rep. of Germany

[21] Appl. No.: 312,419

[22] Filed: Feb. 21, 1989

Related U.S. Application Data

[63] Continuation of Ser. No. 32,683, Apr. 1, 1987, abandoned.

[30] Foreign Application Priority Data

Apr. 1, 1986 [DE] Fed. Rep. of Germany ....... 3610811

[51] Int. Cl.$^5$ .......................... C08K 5/54; C08C 19/20

[52] U.S. Cl. .................................. 524/262; 524/571; 525/331.8; 525/332.7

[58] Field of Search ................. 525/348, 332.7, 333.1, 525/331.8; 524/262, 571

[56] References Cited

U.S. PATENT DOCUMENTS

| | | | |
|---|---|---|---|
| 3,546,185 | 12/1970 | Coran | 525/349 |
| 3,862,051 | 1/1975 | Coran | 252/182 |
| 4,517,336 | 5/1985 | Wolff | 524/571 |
| 4,621,121 | 11/1986 | Schwarze | 525/329.3 |

*Primary Examiner*—Christopher Henderson
*Attorney, Agent, or Firm*—Cushman, Darby & Cushman

[57] ABSTRACT

There is described the use of substituted N-trichloromethyl thiodicarboximides in combination with N,N'-substituted bis-(2,4-diamino-s-triazin-6-yl)-oligosulfides in vulcanizable rubber mixtures in order to improve the vulcanization characteristics and such rubber mixtures.

8 Claims, No Drawings

SUBSTITUTED N-TRICHLOROMETHYL THIODICARBOXIMIDES AND N,N-SUBSTITUTED BIS-(2,4-DIAMINO-S-TRIAZIN-6YL)-OLIGOSULFIDES IN VULCANIZABLE RUBBER

This is a continuation of application Ser. No. 07/032,683, filed April 1, 1987, now abandoned.

BACKGROUND OF THE INVENTION

The invention is directed to the use of substituted N-trichloromethyl thiodicarboximides in combination with N,N'-substituted bis-(2,4-diamino-s-triazin-6-yl)-oligosulfides in vulcanizable rubber mixtures as antiscorchers with an effect which increases the cross-linking density and is also directed to such rubber mixtures. A series of vulcanization accelerators is available for the cross-linking of elastomers with sulfur, whose vulcanization characteristic is completely insufficient itself. These accelerators, even when added in a small amount, both increase the cross-linking density chemically achievable so strongly and so sharply improve the kinetics of the cross-linking that the vulcanization process can also be performed on a mass-production scale in an economical manner.

Even though the cross-linking of rubber mixtures can also be performed without free sulfur, e.g. with the aid of peroxides or thiurams, the invention is directed to the accelerated sulfur vulcanization and the cross-linking with N,N'-substituted bis-(2,4-diamino-s-triazin-6-yl)-oligosulfides in accordance with formula (II) with n=4 without free sulfur. n=4 stands thereby both for tetrasulfides as well as also for mixtures of compounds according to formula II in which $S_n$ corresponds to an average statistical chain length with n=4.

Mercaptans, disulfides and sulphenides based on benzothiazole are the most important accelerators of sulfur vulcanization. Corresponding compounds based on triazine which are similar in their action are described in DE-PS 16 69 954 and DE-PS 12 98 706. The same category also includes the N,N'-substituted bis-(2,4-diamino-s-triazin-6-yl)oligosulfides (n=4) according to formula II described in Schwarze U.S. Pat. application Ser. No. 32,817, filed April 1, 1987, now abandoned which, in contrast to the/above-mentioned accelerators, also cross-link without the addition of free sulfur while building up an —S—, —S—S—, —S—$S_x$—S— cross-linking structure. The entire disclosure of the Schwarze U.S. application is hereby incorporated by reference.

The cross-linking process in accelerated sulfur vulcanization can normally be broken down into 3 phases, namely, into the incubation time of the cross-linking reaction, the cross-linking process itself, characterized by the velocity constant and the cross-linking yield, and into the overheating period. The above-named accelerators differ in their behavior in all 3 phases as a rule.

For reasons of processing safety of rubber mixtures, especially when the processing temperature must be raised in order to increase productivity, so-called retarders or "prevulcanization inhibitors" are added in order to extend the incubation time of the vulcanization reaction. In practice, preferably Santoguard ® PVI (N-cyclohexylthio-phthalimide; C.D. Trivette et al., Rubber Chem. Technol. 50, 570 (1977), Monsanto, U.S. Pat. Nos. 3,427,319; 3,546,185; 3,752,824; 3,855,262) and for benzothiazolyl disulfide preferably Vulkalent ® E (Bayer AG, N-phenyl-N-(trichloromethyl sulfenyl)-benzene sulfonamide, DE-OS 1,957,484) have proven to be effective agents for the delay of sulfur vulcanization with sulfenamides.

SUMMARY OF THE INVENTION

The invention has the task of improving the vulcanization characteristic of vulcanizable rubber mixtures.

The subject matter of the invention is the use of compounds of the general formula

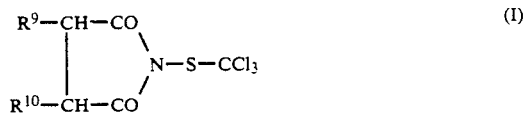

in which $R^9$ is H $R^{10}$ is H, $C_1$–$C_{16}$ alkyl, e.g., methyl, ethyl, propyl, isopropyl, butyl, sec. butyl, hexyl, octyl, decyl, hexadecyl, undecenyl or $R^9$ and $R^{10}$ form, together with the carbon atoms of the dicarboximide in the 3 and 4 position, a six-membered ring, which is saturated or singly or triply unsaturated, which can be substituted once or twice by a methyl group, especially tetrahydrophthalimides of the type

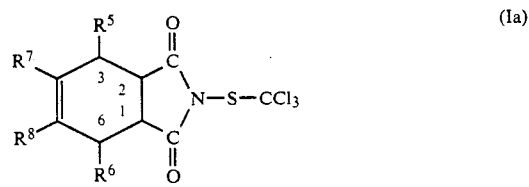

with $R^7$, $R^8$=H, methyl, $R^5$ and $R^6$ an endo-$CH_2$ bridge or an endo-O-bridge, in vulcanizable rubbers in combination with oligosulfidic compounds of the formula

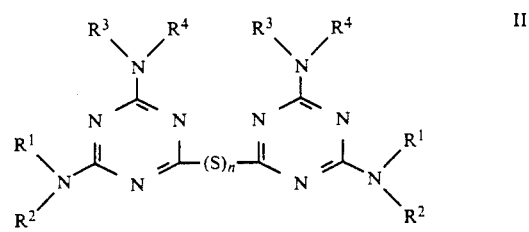

in which R' is hydrogen, $R^2$ is hydrogen, benzyl or as defined for $R^3$ and $R^4$ where $R^3$, $R^4$,=$C_1$--$C_8$-alkyl, e.g., methyl, ethyl, propyl, isopropyl, butyl, amyl, hexyl, preferably $C_1$-$C_4$-alkyl, branched or unbranched, allyl, $C_3$-$C_8$-cycloaklyl, e.g., cyclopentyl, cyclohexyl, the latter being unsubstituted or substituted with 1-3 methyl groups, 2-hydroxyethyl, 3-hydroxypropyl, 2-hydroxypropyl or $R^3$ and $R^4$ together are $C_4$-$C_6$-alkylene, —($CH_2$—CHX$)_2$Y where X=$CH_3$, H; Y=O or S.

n=2 or 4, or a mixture of compounds according to formula (II) in which $S_n$ corresponds to an average statistical chain length with n=4.

The method of preparing the pure tetrasulfides with a linear $S_4$ chain between the two substituted triazine groups is characterized in that an aqueous alkaline solution of the corresponding N,N'-substituted 2,4-diamino-6-mercaptotriazines in a two-phase system is caused to react with an $S_2Cl_2$-solution in an inert organic solvent in which the reaction product is insoluble or very slightly soluble at temperatures between −5° C. and < +20° C., preferably +10° C. An alkaline aqueous solution of the mercaptotriazine is produced with advantage which contains at least the stoichiometric amount of alkali hydroxide necessary for reaction, preferably an excess of 1–20 molar percent in relation to the mercaptotriazine added.

This solution is treated with a solvent in which the final product of the reaction is insoluble or slightly soluble, preferably with $C_5$–$C_{10}$ alkanes, e.g., pentane, hexane, decane, or $C_5$–$C_8$ cycloalkanes, e.g., cyclohexanes, optionally substituted with 1 to 3 methyl groups, and their mixtures. This mixture is vigorously agitated and cooled, preferably to +10° C. Now, a solution of $S_2Cl_2$ in the solvent used is added drop by drop into this mixture under good cooling. $S_2C_{12}$ is used at least in a ratio of 2 moles mercaptotriazine : 1 mole $S_2Cl_2$; however, this ratio can also be 2 : 1.1 – 1.2, as a function of the alkali excess.

Under the given conditions, $S_2Cl_2$ exhibits an exclusively condensing action.

The product formed is separated with the aid of generally known measures and dried with advantage at temperatures up to +50° C. under a vacuum (10 torr).

Mixtures are also used which consist of oligosulfidic compounds of the general formula

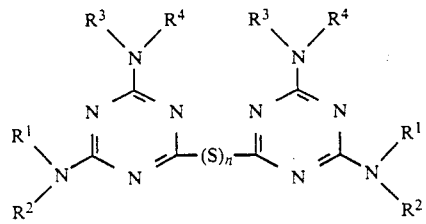

in which $R^1$, $R^2$, $R^3$ and $R^4$ have the meanings given above and $S_n$ corresponds to an average statistical chain length with $n=4$.

These mixtures of oligosulfides, also designated in the following text as disproportionates, since they are produced by the disproportioning of tetrasulfides in accordance with formula II, can be prepared in several ways. The reaction conditions should be controlled in such a manner thereby that no free sulfur is produced.

One method is characterized in that an isolated tetrasulfide according to formula II is heated over its melting point, preferably about 20–50° C. above.

In another method the tetrasulfides according to formula II are dissolved in an inert organic solvent and the disproportioning reaction is performed in a temperature range between 20° C. (allowed to stand at room temperature) and the boiling point of the solvent used.

A particularly elegant method consists in causing an aqueous alkaline solution of the corresponding N,N'-substituted 2,4-diamino-6-mercaptotriazines in a two-phase system to react with a solution of $S_2Cl_2$ in an inert organic solvent which dissolves the tetrasulfide produced. The linear tetrasulfide produced is then disproportionated subsequently at once onto the mixture of the invention.

Particularly suitable solvents are chlorinated hydrocarbons, e.g., $CH_2Cl_2$ and $CHCl_3$; however, ethers, e.g., diethyl ether, esters, e.g., ethyl acetate, and aromatic hydrocarbons, e.g., acetone, methyl ethyl ketone, are also suitable for the disproportionation reaction in the absence of water. Otherwise, they can be used if they form a two-phase mixture with water. The reaction conditions for producing the disproportionates are otherwise identical to those for producing the pure tetrasulfides.

It is of no significance for the suitability of the mixture produced, to what extent the disproportionation reaction has advanced. The only thing to be observed is that no free sulfur is produced during the disproportioning.

It turns out that the substituted N-trichloromethyl thiodicarboximides according to formula (I,Ia) used in accordance with the invention in combination with the triazine compounds according to formula II are not only excellent antiscorchers, but also change the vulcanization characteristic at the same time in such a manner that all physical data which react to the cross-linking density, such as the maximum torque (rheometer) or the tensile moduli at 300% elongation, are raised considerably.

Preferably, N-trichloromethyl thiophthalimide (VZ a) and 1, 2, 3, 6-tetrahydro-N-(trichloromethyl thio)-phthalimide (VZ b) are used.

Other examples for the compounds in accordance with formulas (I, Ia) which can be used in accordance with the invention are:
N-trichloromethyl thio-succinimide (VZ c)
N-trichloromethyl thio-dodecylsuccinimide
N-trichloromethyl thio-7-oxabicyclo-(2.2.1)-hept-5-en-2.3-dicarboximide
N-trichloromethyl thio-5-norbornene-1,2-dicarboximide These materials are known, a few of them are produced on a large scale and are used as fungicides in agriculture (Captan ® and Folpet ®). They are produced from the corresponding dicarboximides and perchloromethyl mercaptan=trichlorosulfenyl chloride in the presence of an acid acceptor (Chevron, U.S. Pat. Nos. 2,553,770; 2,553,771; 2,553,776; Bayer, U.S. Pat. No. 2,846,442; Zefirov and Yuref, C.A. 55,page 504). Previously, only the use of N-trichloromethyl thiophthalimide was described in rubber mixtures in combination with sulfenamides of benzothiazole, e.g. of benzothiazolyl-cyclohexyl-sulfenamide or of benzothiazolyl-2sulfenmorpholide (SU-PS 164,670, J.J. Eitington et al.) with only a weak retarding action.

The N,N'-substituted bis-(2,4-diamino-s-triazin-6-yl)-disulfides according to formula II are described in DE-PS 16 69 954, e.g.
Bis-(2-ethylamino-4-diethylamino-s-triazin-6-yl)disulfide
Bis-(2-ethylamino-4-di-isopropylamino-s-triazin-6-yl)-disulfide
Bis-(2-n-propylamino-4-diethylamino-s-triazin-6-yl)-disulfide
Bis-(2-ethylamino-4-di-n-butylamino-s-triazin-6-yl)-disulfide Examples of N,N'-substituted bis-(2,4-diamino-s-triazin-6-yl)-tetrasulfides and their disproportionates are:
A: Bis-(2-ethylamino-4-di-isopropylamino-s-triazin-6-yl)-tetrasulfide
B: Bis-2-n-butylamino-4-diethylamino-s-triazin-6-yl)-tetrasulfide
C: Bis-(2-isopropylamino-4-di-isopropylamino-s-triazin-6-yl)-tetrasulfide
D: Bis-(2-ethylamino-4-di-isobutylamino-s-triazin-6-yl)-tetrasulfide
E: Bis-(2-ethylamino-4-di-n-propylamino-s-triazin-6-yl)-tetrasulfide F: Bis-(2-n-propylamino-4-diethylamino-s-triazin-o-yl)-tetrasulfide G: Bis-(2-n-propylamino-4-di-n-propylamino-s-triazin-6-yl)-tetrasulfide H: Bis-(2-n-butylamino-4-di-n-propylamino-s-triazin-6-yl)-tetrasulfide I: Bis-(2-ethylamino-4-di-n-butylamino-s-triazin-6-yl)-tetrasulfide K: Bis-(2-isopropylamino-4-di-isopropylamino-s-triazin-6-yl)-oligosulfide mixture L: Bis-(2-cyclohexylamino-4-diethylamino-s-triazin-6-yl)-oligosulfide mixture M: Bis-(2-ethylamino-4-diethylamino-s-triazin-6-yl)-oligosulfide mixture N: bis-(2-ethylamino-4-diethylamino-triazin-6-yl)tetrasulfide O: Bis-(2-amino-4-diethylamino-s-triazin-6-yl)-oligosulfide mixture The substituted N-tricloromethyl thiodicarboximides to be used in accordance with the invention as antiscorchers with an effect which increases the cross-linking density in combination with N,N'-substituted bis(2,4-diamino-s-triazin-6-yl)-sulfides according to formula (II) are suitable for the rubber mixtures known in the state of the art including natural rubber (NR), isoprene rubbers (IR), butadiene rubbers (BR), styrolbutadiene rubbers (SBR), isobutylene-isoprene rubbers (IIR), ethylene-propyleneter-polymers (EPDM), nitrile rubbers (NBR), halogen-containing rubbers and also epoxidized natural rubbers (ENR) as well as their blends.

According to the invention, compounds according to formula (I,Ia) are added in an amount of 0.1–5 parts and the N,N'-substituted bis-(2,4-diamino-s-triazin-6-yl)-sulfides (n=4) according to formula II are added in an amount of 0.1–10 parts per 100 parts rubber. The molar ratio of triazine cross-linking agent to antiscorcher is preferably from 1 : 0.3 – 1.5, preferably 1 : 0.3 – 1.2. In this instance the mixture does not contain any free sulfur.

In accelerated sulfur vulcanization, the substituted N-trichlormethyl thiocarboximides according to formulas (I,Ia) are added in amounts of 0.1–5 parts, preferably 0.1–2 parts per 100 parts rubber at sulfur amounts of 0.1–10 parts, preferably 0.1–8 parts per 100 parts rubber. Molar ratios of accelerator, antiscorcher, sulfur of 1 : 0.3–1.5 : 0.5–1.5, preferably 1 : 0.3–1.2 : 0.5–1.5 are preferred. Oligosulfides according to formula II are then used in amounts of 0.1–10 parts. In order to achieve a broader range of variation of the vulcanization kinetics, it can be advantageous to add the triazine accelerators according to formula II in the form of mixtures of two or several individuals, whereby the substitution is to be performed on a molar basis in order to maintain the amounts to be used indicated above, especially the preferred molar ratios.

The substitution when using the triazine compounds according to formula (II) is to be performed in the same manner if the work is performed without sulfur.

It can be advantageous, also for kinetic reasons, to use the N,N'-substituted bis-(2,4-diamino-s-triazin-6-yl)-oligosulfides according to formula II in admixture with conventional accelerators of the benzothiazole series and/or thiurams, e.g. N-cyclohexyl benzothiazole sulfenamide, 2-mercaptobenzothiazole, benzothiazolyl disulfide and their zinc salts and tetramethyl thiuram disulfide (see also J. van Alphen, Rubber Chemicals, 1977, pp. 1–46), the entire disclosure of which is hereby incorporated by reference and relied upon.

Significant vulcanization problems can be solved with these dosing guidelines without a loss of vulcanizate properties occurring.

N,N'-substituted bis-(2,4-diamino-s-triazin-6-yl)-oligosulfides according to formula II can be used with advantage together with organosilanes, e.g.

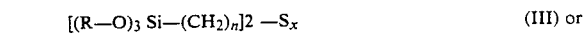  (III) or

  (IV)

where
n=2,3;
x=2–6;
R=$C_1$–$C_6$-alkyl or cyclohexyl

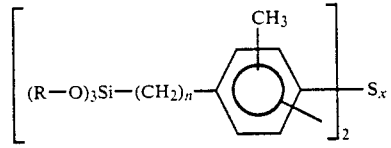

where x=2–6, preferably 3, preferably bis-(3-triethoxysilylpropyl)-tetrasulfide (Si 69, Degussa AG), namely in sulfur-free Si 69 cross-linking (DE-PS 25 36 674 and related Wolff U.S. Pat. No. 4,229,333), in sulfur vulcanization with Si 69 (DE-PS 22 55 577 and related Thurn U.S. Pat: No. 3,873,489) and likewise in the production of reversion-stable vulcanizates by means of the construction of equilibrium cure systems according to DE-PS 28 48 559 and related Wolff U.S. Pat. No. 4,517,336. The entire disclosures of the Thurn U.S. Pat. and the two Wolff U.S. Pats. are hereby incorporated by reference and relied upon. In all the instances cited, substituted N-trichloromethyl thiodicarboximides according to formula (I,Ia) function as suitable antiscorchers with an effect which increases the cross-linking density.

The vulcanization-retarding action of substituted N-trichloromethyl thiodicarboximides according to formula (I, Ia) also occurs when N,N'-substituted bis-(2,4-diamino-s-triazin-6-yl)-oligosulfides according to formula (II) are used alone or in a mixture together with conventional accelerators and/or with customary sulfur donors such as, e.g., Sulfasan ® (morpholine disulfide).

The use of substituted N-trichloromethyl thiodicarboximides as antiscorchers with an effect which increases the cross-linking density in combination with N,N'-substituted bis-(2,4-diamino-s-triazin-6-yl)-oligosulfides according to formula (II) occurs in rubber mixtures which can contain the following as other customary mixture components:

Reinforcing systems, i.e. furnace blacks, channel blacks, flame blacks, thermal blacks, acetylene blacks, arc carbon blacks, CK carbon blacks etc. as well as synthetic fillers such as silicas, silicates, aluminum oxide hydrates, calcium carbonates and natural fillers like clays, chalk flints, chalks, talcs, etc., as well as silane-modified fillers and their blends in amounts of 5–300 parts per 100 parts rubber, zinc oxide and stearic acid as vulcanization promoters in amounts of 0.5–10 parts per 100 parts rubber, customarily used antiageing, antiozone and antifatigue agents such as, e.g., IPPD, TMQ, etc. and also waxes as antilight protective agents and their blends, any softeners such as, e.g., aromatic, naphthenic, paraffinic, synthetic softeners and their blends, organosilanes optionally used in the rubber industry in accordance with the state of the art, e.g., -chloropropyltrialkoxysilanes, e.g., chloropropyldiethoxysilane, vinyl trialkoxysilanes,e.g., vinyl triethoxysilane, -mercaptoalkyl trialkoxysilanes and amino alkyl trialkoxysilanes as well as their blends in an amount of 0.1–25, preferably 1–10- parts per 100 parts fillers carrying silanol groups such as silicas, silicates, clays, etc.

optionally dyes and processing adjuvants in a customary dose.

Production and vulcanization of the rubber mixtures are performed according to the known methods and under the customary conditions.

The area of application of the N-(trichloromethyl thio)-dicarboximides in combination with N,N'-substituted bis-(2,4-diamino-s-triazin-6-yl)sulfides in accordance with formula (I), (Ia) and (II) extends to rubber mixtures like those customarily used in tire construction, to industrial articles such as, e.g., mixtures for conveyor belts, V-belts, formed articles, hoses with and without inserts, rubber coatings for rollers, jacketings, spray profiles, freehand articles, foils, shoe soles and upper parts, cables, solid-rubber tires and their vulcanizates.

The production and vulcanization of the rubber mixtures are performed according to the known methods and under the customary conditions.

The composition can comprise, consist essentially of or consist of the stated materials and the process can comprise, consist essentially of or consist of the recited steps with such materials.

DETAILED DESCRIPTION

EXAMPLE 1

454 g 2-ethylamino-4-diethylamino-6-mercaptotriazine are dissolved in sodium hydroxide solution produced from 84 g NaOH+1.5 liters $H_2O$.

The solution is put into a 4-liter 3-tube flask, then 1.5 liters light gasoline (boiling pt. 80–110° C.) are added and the mixture is cooled to 0° C. under vigorous agitation.

Now, a solution of 137 g $S_2Cl_2$ is allowed to run for 20 min. into 100 ml gasoline, whereby care is taken that the temperature does not exceed +5° C.

The tetrasulfide precipitates immediately. At the end of the reaction, the matter is subsequently agitated 5 min., then filtered off by suction and washed.

The snow-white fine powder is dried in a vacuum/12 torr at 40–45° C.

Amount: 499.5 g, corresponding to 97.1% of theory, M.P. 149–150° C.

Analysis: bis-(2-ethylamino-4-diethylamino-s-triazin-6-yl)-tetrasulfide, gram-molecular weight 516, $C_{18}H_{32}N_{10}S_4$ Calculated: C 41.9; H 6.2; N 27.1; S 24.8; Found: 41.8; 6.5; 26.8; 24.8

TLC and HPLC analysis show that the product contains 97.1% linear tetrasulfide.

EXAMPLE 2

56.6 g 2-ethylamino-4-di-n-butylamino-6-mercaptotriazine are dissolved in a solution of 8.8 NaOH in 250 ml water. 250 ml gasoline is added thereto. After being well-agitated, the mixture is cooled off to +5° C. Now a solution of 13.5% $S_2Cl_2$ in 30 ml gasoline is allowed to run in. A white precipitate forms immediately. At the end of the reaction, a work-up in accordance with Example 1 is performed.

Amount: 56 g, corresponding to 89.2% of theory.

Analysis: $C_{26}H_{45}N_{10}S_4$ (gram-molecular wt. 628) Calculated: C 49.68; H 7.64; N 22.29; S 20.38; Found: 49.59; 7.59; 22.18; 20.40

HPLC analysis: degree of purity >96%.

EXAMPLE 3

107.6 g 2-i-propylamino-4-diisopropylamino-6-mercaptotriazine are dissolved in sodium hydroxide solution produced from 17.6 g NaOH in 600 ml $H_2O$. 600 ml methylene chloride are added thereto.

A solution of 27 g $S_2Cl_2$ is allowed to run at 0–5° C. into 50 ml $CH_2Cl_2$. At the end of the reaction, the organic phase is separated is a separatory funnel, dried and concentrated by evaporation in a vacuum. An amorphous powder is obtained; softening point: 90C.

Yield: 112.5 g, corresponding to 94% of theory.

Analysis: $C_{24}H_{44}N_{10}S_4$ (gram-molecular wt. 600) Calculated: C 48; H 7.33; N 23.3; S 21.3; Found: 48.2; 7.36; 23.01; 20.95

EXAMPLE 4

45.4 g 2-ethylamino-4-diethylamino-6-mercaptotriazine is dissolved in sodium hydroxide solution prepared from 8.8 g NaOH and 200 ml water. 200 ml methylene chloride is added thereto. The mixture is stirred vigorously and cooled down to 0° C. Now, 14 g $S_2Cl_2$ is dissolved in 50 ml $CH_2Cl_2$ and this solution is allowed to run into the mercaptide solution.

The reaction product dissolves in $CH_2Cl_2$. At the end of the reaction, the phases are separated and the $CH_2Cl_2$ solution is worked up. This yields an amorphous powder with a softening point of approximately 110° C.

Amount: 46.7 g, corresponding to 90.5% of theory.

Analysis: $C_{18}H_{32}N_{10}S_4$ (gram-molecular wt. 516) Calculated: N 27.1; S 24.8; Found: 26.8; 24.4

According to TLC analysis, a mixture of 4 oligosulfides but no free sulfur is obtained.

EXAMPLE 5

50 g bis-(2-ethylamino-4-diethylamino-s-triazin-6-yl)-tetrasulfide with a degree of purity of 97.1% are placed in a round flask and heated in an oil bath for 1 hour at 60° C. When cold, the melt solidifies amorphously. According to TLC analysis, the product contains in addition to approximately 50% initial product 3 other oligosulfides.

EXAMPLE 6

70.25 g 2-cyclohexylamino-4-diethylamino-6-mercaptotriazine are dissolved in 11 g NaOH and 250 ml water. 250 ml chloroform are added thereto. A solution of 18.8 g $S_2Cl_2$ is allowed to run into 30 ml $CHCl_2$ under vigorous agitation. At the end of the reaction, the phase is separated and the chloroform layer is worked up. 71.9 g of a white amorphous powder are obtained, corresponding to 92% of the theory.

Analysis: $C_{26}H_{44}N_{10}S_4$ (gram-mol. wt. 624) Calculated: C 50; H 7.05; N 22.4; S 20.51; Found: 49.1; 6.90; 21.8; 20

According to TLC analysis, the product is composed of approximately 30% linear $S_4$ product and 70% oligosulfides but contains no free sulfur.

TEST STANDARDS

The physical tests were performed at room temperature according to the following standard specifications:

| (DIN = GERMAN INDUSTRIAL STANDARD) | | Measured in |
|---|---|---|
| Tensile Moduli 300% | DIN 53504 | MPa |
| Incubation Time t | DIN 53529 | min |
| Scorch Time | ASTM 2084 | min |
| Shore-A-Hardness | DIN 53505 | Nm |

The following names and abbreviations are used in the examples of use, the meanings of which are indicated in the following table.

| | |
|---|---|
| RSS: | ribbed smoked sheet (natural rubber) |
| CORAX ® N 220: | carbon black, surface area (BET) 120 m²/g (Degussa) |
| Naftolen ® ZD: | softener made of hydrocarbons |
| Vulkanox ® 4010 NA: | N-isopropyl-N'-phenyl-p-phenylene diamine |
| Vulkanox ® HS: | poly-2,2,4-trimethyl-1-2-dihydroquinoline |
| Mesamoll ® | alkyl sulfonic acid ester from phenol and cresol |
| Protektor ® G 35: | antiozonant wax |
| Vulkacit ® MOZ: | benzothiazole-2-morpholinosulfenamide |
| Vulkalent ® E | N-phenyl-N-(trichloromethyl sulfenyl)-benzenesulfonamide |
| PVI: | N-cyclohexyl thiophthalimide |
| Ultrasil ® VN 3: | preciptitated silica acid (Degussa) |
| Gran. | granulate |
| V 143: | bis-(2-ethylamino-4-diethylamino-s-triazin-6-yl)-disulfide |
| V 225: | bis-(2-isopropylamino-4-diisopropylamino-s-triazin-6-yl)-disulfide |
| Sulfasan ® | morpholine disulfide |

EXAMPLE 7

Action of VZ materials in combination with N,N'-substituted bis-(2,4-diamino-s-triazin-6-yl)-oligosulfides as accelerator in N 220-filled NR mixtures

| | 1 | 2 | 3 | 4 | 5 | 6 | 7 |
|---|---|---|---|---|---|---|---|
| RSS 1, ML (1 + 4) = 70 — 80 | 100 | 100 | 100 | 100 | 100 | 100 | 100 |
| CORAX N 220 | 50 | 50 | 50 | 50 | 50 | 50 | 50 |
| ZnO RS | 5 | 5 | 5 | 5 | 5 | 5 | 5 |
| Stearic Acid | 2 | 2 | 2 | 2 | 2 | 2 | 2 |
| Naftolen ZD | 3 | 3 | 3 | 3 | 3 | 3 | 3 |
| Protektor G 35 | 1 | 1 | 1 | 1 | 1 | 1 | 1 |
| Vulkanox HS | 1.5 | 1.5 | 1.5 | 1.5 | 1.5 | 1.5 | 1.5 |
| Vulkanox 4010 NA | 2.5 | 2.5 | 2.5 | 2.5 | 2.5 | 2.5 | 2.5 |
| Vulkacit MOZ | 1.43 | — | — | — | — | — | — |
| V 143 | — | 1.29 | 1.29 | 1.29 | — | — | — |
| D | — | — | — | — | 1.5 | 1.5 | 1.5 |
| VZ a | — | — | 0.4 | — | — | 0.8 | — |
| VZ b | — | — | — | 0.4 | — | — | 0.8 |
| Sulfur | 1.5 | 1.5 | 1.5 | 1.5 | 1.5 | 1.5 | 1.5 |
| $D_{max}-D_{min}$ (170° C.), Nm | 8.56 | 8.04 | 9.58 | 9.62 | 7.28 | 8.45 | 8.53 |
| $t_f$ (170° C.), min. | 4.5 | 3.7 | 4.8 | 4.9 | 2.9 | 4.3 | 4.2 |
| Cross-linking velocity (t 90%-t 10%), min | 2.5 | 2.3 | 2.5 | 2.5 | 3.4 | 3.1 | 3.1 |
| $t_1$ (130° C.), min | 22.5 | 15.0 | 24.5 | 24.0 | 9.5 | 22.0 | 21.5 |
| Vulcanizate data at 170° C. | | | | | | | |
| Tensile Modulus 300% | 10.2 | 10.3 | 11.5 | 11.6 | 10.6 | 11.3 | 11.3 |

Example 7 demonstrates that the addition of N-trichloromethyl thiophthalimides for di- and tetrasulfidic triazines results in a scorch retardation (Mixtures 2–7) which raises the scorch time to the level of sulfenamide acceleration (Mixture 1). In addition, in NR filled with carbon black, no change of the cross-linking speed can be determined, but there is an improvement of the 300% tensile moduli.

EXAMPLE 8

Comparison of VZ materials to Vulkalent E in N 220-filled NR in combination with N,N'-substituted bis-(2,4-diamino-s-triazin-6-yl)-oligosulfides as accelerators.

| | 8 | 9 | 10 | 11 | 12 | 13 |
|---|---|---|---|---|---|---|
| RSS 1, ML (1 + 4) = 70 — 80 | 100 | 100 | 100 | 100 | 100 | 100 |
| CORAX N 220 | 50 | 50 | 50 | 50 | 50 | 50 |
| ZnO RS | 5 | 5· | 5 | 5 | 5 | 5 |
| Stearic Acid | 2 | 2 | 2 | 2 | 2 | 2 |
| Naftolen ZD | 3 | 3 | 3 | 3 | 3 | 3 |
| Protektor G35 | 1 | 1 | 1 | 1 | 1 | 1 |
| Vulkanox HS | 1.5 | 1.5 | 1.5 | 1.5 | 1.5 | 1.5 |
| Vulkanox 4010 NA | 2.5 | 2.5 | 2.5 | 2.5 | 2.5 | 2.5 |
| Vulkacit MOZ | 1.43 | — | — | — | — | — |
| N | — | 1.5 | 1.5 | 1.5 | 1.5 | 1.5 |
| Vulkalent E | — | — | 0.8 | — | — | — |
| VZ a | — | — | — | 0.8 | — | — |

-continued

|  | 8 | 9 | 10 | 11 | 12 | 13 |
|---|---|---|---|---|---|---|
| VZ b | — | — | — | — | 0.8 | — |
| VZ c | — | — | — | — | — | 0.8 |
| Sulfur | 1.5 | 0.8 | 0.8 | 0.8 | 0.8 | 0.8 |
| $t_f$ (170° C.), min. | 4.5 | 2.9 | 3.8 | 4.3 | 4.2 | 4.3 |
| $t_1$ (130° C.), min | 22.5 | 9.5 | 14.0 | 22.0 | 21.5 | 20.5 |
| Vulcanizate data at 170° C. | | | | | | |
| Tensile Modulus 300% | 10.2 | 10.6 | 10.7 | 10.2 | 10.6 | 10.7 |

The comparison of Vulkalent E (Mixture 10) to VZ materials (Mixtures 11–13) shows that the VZ materials result in a longer incubation time and a higher tensile modulus at 300% expansion.

EXAMPLE 9:

Temperature dependency of the mode of action of VZ materials in acceleration of the vulcanization with bis-(2-ethylamino-4-diethylamino-s-triazin-6-yl)-disulfide in N 220-filled NR.

|  | 14 | 15 | 16 |
|---|---|---|---|
| RSS 1, ML (1 + 4) = 70 – 80 | 100 | 100 | 100 |
| CORAX N 220 | 50 | 50 | 50 |
| ZnO RS | 5 | 5 | 5 |
| Stearic Acid | 2 | 2 | 2 |
| Naftolen ZD | 3 | 3 | 3 |
| Vulkanox 4010 NA | 2.5 | 2.5 | 2.5 |
| Vulkanox HS | 1.5 | 1.5 | 1.5 |
| Protektor G 35 | 1 | 1 | 1 |
| V 143 | 1.29 | 1.29 | 1.29 |
| VZ a | — | 0.8 | — |
| VZ b | — | — | 0.8 |
| Sulfur | 1.5 | 1.5 | 1.5 |
| $t_f$ min. | | | |
| 145° C. | 9.2 | 17.0 | 17.5 |
| 160° C. | 5.2 | 8.2 | 8.2 |
| 170° C. | 4.0 | 5.2 | 5.7 |
| 180° C. | 2.8 | 4.0 | 4.0 |
| Vulcanization velocity, min: | | | |
| ($S_{90\%}-t_{10\%}$) | | | |
| 145° C. | 15.9 | 18.9 | 18.2 |
| 160° C. | 4.1 | 5.4 | 5.2 |
| 170° C. | 2.0 | 3.0 | 2.6 |
| 180° C. | 1.3 | 1.6 | 1.6 |
| Vulcanizate data: | | | |
| Tensile modulus 300%, MPa | | | |
| 145° C. | 10.6 | 12.3 | 13.1 |
| 170° C. | 9.5 | 12.0 | 12.5 |
| Shore-A-Hardness | | | |
| 145° C. | 65 | 69 | 69 |
| 170° C. | 63 | 68 | 68 |

The addition of VZ materials brings about a considerable prolongation of the incubation time at processing temperatures (<145° C.) without any essential decrease in the vulcanization time at higher temperatures and in each case an effective increase of the 300% tensile strength.

EXAMPLE 10

Action of VZ material on the acceleration with bis-(2-ethylamino-4-diethyl amino-s-triazin-6yl)-tetrasulfide (N) in NR filled with carbon black/silica acid.

|  | 17 | 18 | 19 |
|---|---|---|---|
| RSS 1, ML (1 + 4) = 70 – 80 | 100 | 100 | 100 |
| CORAX N 220 | 25 | 25 | 25 |
| Ultrasil VN 3 Gran. | 25 | 25 | 25 |
| ZnO RS | 5 | 5 | 5 |
| Stearic Acid | 2 | 2 | 2 |

-continued

|  | 17 | 18 | 19 |
|---|---|---|---|
| Naftolen ZD | 3 | 3 | 3 |
| Protektor G35 | 1 | 1 | 1 |
| Vulkanox 4010 NA | 2.5 | 2.5 | 2.5 |
| Vulkanox HS | 1.5 | 1.5 | 1.5 |
| Vulkacit MOZ | 1.43 | — | — |
| N | — | 3 | 3 |
| VZ a | — | — | 0.8 |
| Sulfur | 1.5 | 0.8 | 0.8 |
| $t_f$ (170° C.), min. | 4.6 | 3.8 | 4.7 |
| $t_1$ (130° C.), min | 3.6 | 5.9 | 8.6 |
| Vulcanizate data at 170° C. | | | |
| Tensile Modulus 300% | 3.6 | 5.9 | 8.6 |

The addition of VZ a (Mixture 19) in NR mixtures filled with N 220/silica shows a prolongation of the incubation time to the reference level (Mixture 17) and at the same time an increase of the tensile modulus 300% in comparison to Mixtures 17 and 18.

EXAMPLE 11

Action of VZ a in carbon black-filled NR accelerated with a V 143/MOZ blend.

|  | 20 | 21 | 22 |
|---|---|---|---|
| RSS 1, ML (1 + 4) = 70 – 80 | 100 | 100 | 100 |
| CORAX N 220 | 50 | 50 | 50 |
| ZnO RS | 5 | 5 | 5 |
| Stearic Acid | 2 | 2 | 2 |
| Naftolen ZD | 3 | 3 | 3 |
| Protektor G35 | 1 | 1 | 1 |
| Vulkanox 4010 NA | 2.5 | 2.5 | 2.5 |
| Vulkanox HS | 1.5 | 1.5 | 1.5 |
| Vulkacit MOZ | 1.43 | 0.72 | 0.72 |
| V 143 | | 0.75 | 0.75 |
| VZ a | — | — | 0.4 |
| Sulfur | 1.5 | 1.5 | 1.5 |
| $D_{Max}-D_{min}$ | | | |
| (170° C.) Nm | 8.56 | 8.24 | 8.87 |
| $t_f$ (170° C.), min. | 4.5 | 4.1 | 4.7 |
| $t_1$ (130° C.), min | 22.5 | 15.0 | 19.3 |

The incubation time is likewise prolonged by the addition of VZ a (Mixture 22) with the mutual usage of N,N'-substituted bis-(2,4-diamino-s-triazin-6yl)-sulfides with commercial sulfenamide accelerators (Mixture 21).

EXAMPLE 12

Action of VZ b in combination with N,N'-substituted bis-(24-diamino-s-triazin-6yl)-oligosulfide/Si 69 in NR mixtures filled with carbon black/silica.

|  | 23 | 24 | 25 |
|---|---|---|---|
| RSS 1, ML (1 + 4) = 70 – 80 | 100 | 100 | 100 |
| CORAX N 220 | 25 | 25 | 25 |
| Ultrasil VN 3 Gran. | 25 | 25 | 25 |
| Si 69 | 3.75 | 3.75 | 3.75 |
| ZnO RS | 5 | 5 | 5 |
| Stearic Acid | 2 | 2 | 2 |

-continued

|  | 23 | 24 | 25 |
|---|---|---|---|
| Naftolen ZD | 3 | 3 | 3 |
| Protektor G35 | 1 | 1 | 1 |
| Vulkanox 4010 NA | 2.5 | 2.5 | 2.5 |
| Vulkanox HS | 1.5 | 1.5 | 1.5 |
| Vulkacit MOZ | 1.43 | — | — |
| B | — | 1.66 | 1.66 |
| VZ b | — | — | 0.8 |
| Sulfur | 1.5 | 1.5 | 1.5 |
| $t_I$ (170° C.), min. | 4.9 | 4.2 | 5.2 |
| $t_I$ (130° C.), min. | 37.5 | 25.4 | 36.6 |

As can be seen in Example 12, a scorch delay is achieved even in the presence of Si 69 in NR filled with carbon black/silica.

EXAMPLE 13

Action of VZ b in an NR mixture with sulfur donor filled with N 220 and cross-linked using D.

|  | 23 | 24 | 25 |
|---|---|---|---|
| RSS 1, ML (1 + 4) = 70 — 80 | 100 | 100 | 100 |
| CORAX N 220 | 50 | 50 | 50 |
| ZnO RS | 5 | 5 | 5 |
| Stearic Acid | 2 | 2 | 2 |
| Naftolen ZD | 3 | 3 | 3 |
| Protektor G35 | 1 | 1 | 1 |
| Vulkanox 4010 NA | 2.5 | 2.5 | 2.5 |
| Vulkanox HS | 1.5 | 1.5 | 1.5 |
| Vulkacit MOZ | 1.43 | — | — |
| D | — | 1.76 | 1.76 |
| VZ b | — | — | — |
| Sulfur | 1.5 | — | — |
| Sulfasan R | — | 0.7 | 0.7 |
| $t_I$ (170° C.), min. | 4.5 | 3.2 | 4.8 |
| $t_I$ (130° C.), min. | 22.5 | 11.5 | 21.0 |

Even when used in NR mixtures with sulfur donor together with N,N'-substituted bis-(2,4-diamino-s-triazin-6-yl)-oligosulfides, the addition of VZ b results, as Mixture 28 shows, in a distinct scorch retardation to the level of the reference mixture with sulfenamide acceleration and sulfur (Mixture 26).

EXAMPLE 14

Influence of VZ a in combination with N,N'-substituted bis-(2,4-diamino-s-triazin-6yl)-oligosulfides in BR filled with N 330.

|  | 29 | 30 | 31 | 32 |
|---|---|---|---|---|
| Buna CB 10 | 100 | 100 | 100 | 100 |
| CORAX N 330 | 60 | 60 | 60 | 60 |
| Stearic Acid | 2 | 2 | 2 | 2 |
| Naftolen ZD | 15 | 15 | 15 | 15 |
| Protektor G 35 | 1 | 1 | 1 | 1 |
| Vulkanox 4010 NA | 1.5 | 1.5 | 1.5 | 1.5 |
| D | 1.76 | 1.76 | — | — |
| V 225 | — | — | 1.5 | 1.5 |
| VZ a | — | 0.8 | — | 0.8 |
| Sulfur | 1.5 | 1.5 | 1.5 | 1.5 |
| $t_I$ (165° C.), min. | 4.3 | 5.7 | 6.8 | 9.7 |
| Vulcanizate data at 165° C. |  |  |  |  |
| Tensile Modulus 300% | 7.1 | 9.8 | 6.0 | 8.8 |

Example 14 shows the incubation time prolongation of N,N'-substituted bis-(2,4-diamino-s-triazin-6yl)-di- and tetrasulfide-accelerated, N 330-filled polybutadiene and at the same time the considerable increase in tensile modulus 300%.

EXAMPLE 15

Action of VZ a in combination with N,N'substituted bis-(24,-diamino-s-triazin-6yl)-oligosulfides as accelerators in NR/BR blend.

|  | 37 | 38 | 39 | 40 | 41 |
|---|---|---|---|---|---|
| RSS 1, ML (1 + 4) = 70 — 80 | 70 | 70 | 70 | 70 | 70 |
| Buna CB 10 | 30 | 30 | 30 | 30 | 30 |
| CORAX N 220 | 50 | 50 | 50 | 50 | 50 |
| ZnO Active | 5 | 5 | 5 | 5 | 5 |
| Stearic Acid | 2 | 2 | 2 | 2 | 2 |
| Naftolen ZD | 3 | 3 | 3 | 3 | 3 |
| Protektor G 35 | 1 | 1 | 1 | 1 | 1 |
| Vulkanox HS | 1.5 | 1.5 | 1.5 | 1.5 | 1.5 |
| Vulkanox 4010 NA | 2.5 | 2.5 | 2.5 | 2.5 | 2.5 |
| Vulkacit MOZ | 1.43 | — | — | — | — |
| D | — | 1.76 | 1.76 | — | — |
| V 225 | — | — | — | 1.5 | 1.5 |
| VZ a | — | — | 0.8 | — | 0.8 |
| VZ b | — | — | — | 0.4 | — |
| Sulfur | 1.5 | 0.8 | 0.8 | 0.8 | 0.8 |
| $t_I$ (170° C.), min. | 3.7 | 2.7 | 4.2 | 4.7 | 7.1 |
| $t_I$ (130° C.), min. | 12.9 | 6.6 | 14.0 | 22.3 | 45.0 |

Example 15 shows that even in a blend of NR with synthetic rubber, a clear gain in scorch safety can be achieved by the addition of VZ materials.

EXAMPLE 16

Action of VZ b in combination with N,N'substituted bis-(24,-diamino-s-triazin-6yl)-oligosulfides as accelerators in NBR mixtures filled with N 330.

|  | 33 | 34 | 35 | 36 |
|---|---|---|---|---|
| Perbunan N 3307 NS | 100 | 100 | 100 | 100 |
| CORAX N 330 | 60 | 60 | 60 | 60 |
| ZnO Active | 5 | 5 | 5 | 5 |
| Stearic Acid | 1 | 1 | 1 | 1 |
| Mesamoll | 10 | 10 | 10 | 10 |
| Paraffin solid | 1 | 1 | 1 | 1 |
| Vulkanox HS | 1.5 | 1.5 | 1.5 | 1.5 |
| D | 1.76 | 1.76 | — | — |
| V 225 | — | — | 1.5 | 1.5 |
| VZ b | — | 0.8 | — | 0.8 |
| Sulfur | 1.2 | 1.2 | 1.2 | 1.2 |
| $D_{max}-D_{min}$ (170° C.) Nm | 9.23 | 12.95 | 8.18 | 12.59 |
| $t_I$ (170° C.), min. | 3.5 | 4.9 | 4.8 | 8.4 |
| Vulcanization Velocity |  |  |  |  |
| t 90-t 10%, min. | 8.2 | 2.7 | 9.4 | 3.1 |
| Vulcanizate data at 170° C. |  |  |  |  |
| Tensile Modulus 300% | 14.0 | 17.1 | 11.6 | 15.5 |

The addition of VZ b to NBR mixtures in the presence of N,N'-substituted bis-(2,4-diamino-s-triazin-6-yl)-oligosulfides makes possible an improvement of the scorch safety while increasing the vulcanization speed at the same time. A considerable increase of the tensile modulus 300% also occurs in spite of the already very high initial level.

The entire disclosure of German priority application P 3610811.1 is hereby incorporated by reference.

We claim:

1. A sulfur-vulcanizable rubber composition containing (a) 0.1–5 parts substituted N-trichloromethyl thiocarboximide and (b) 0.1–10 parts N,N'-substituted bis-(2,4-diamino-s-triazin-6-yl)-oligosulfide and (c) 0.1–15 10 parts sulfur, each per 100 parts rubber, whereby the three components are in a molar ratio of 0.3–1.5 : 0.5–1.5.

2. A sulfur vulcanizable composition according to claim 1 wherein (a), (b) and (c) are present in a molar ratio of 0.3–1.2 : 1 : 0.5–1.5.

3. A rubber composition according to claim 1 where the substituted N-trichloromethyl thiocarboximide is N-trichloromethyl thiophthalimide.

4. A rubber composition according to claim 1 where the substituted N-trichloromethyl thiocarboximide is 1,2,3,6-tetrahydro-N-(trichloromethylthio)-phthalimide.

5. A rubber composition according to claim 1 including a benzothiazole or thiuram accelerator.

6. A rubber composition according to claim 1 including an organosilane of the formula

where $n = 2, 3;$
$x = 2-6;$
$R = C_1-C_6$-alkyl or cyclohexyl

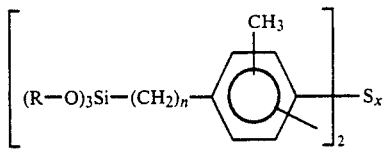

where $x = 2 \geq 6$, preferably 3,

7. A rubber composition according to claim 1 including an additional sulfur donor.

8. A vulcanizable rubber composition according to claim 1 containing (a) 0.1–5 parts substituted N-trichloromethyl thiocarboximides according to formula (I) and (b) 0.1 to 10 parts N,N'-substituted bis-(2,4-diamino-s-triazin-6-yl)-oligosulfide according to formula II with $n = 4$, each per 100 parts rubber, whereby both components (a) and (b) are present in a molar ratio of 0.3–1.5 : 1 and no free sulfur is present.

* * * * *